United States Patent [19]
Fan et al.

[11] Patent Number: 5,519,010
[45] Date of Patent: May 21, 1996

[54] SULFATED POLYSACCHARIDE, PHARMACEUTICALLY ACCEPTABLE SALT THEREOF, PROCESS FOR PREPARING SAME AND MEDICAMENT CONTAINING SAME AS EFFECTIVE COMPONENT

[75] Inventors: Hui-Zeng Fan; Song Yu, both of Tianjin, China; Etsuji Yamanaka; Kazuhiro Numata, both of Honjo, Japan; Toshinori Oka, Itano, Japan; Norihiko Suzuki; Yoshiyuki Muranaka, both of Tokushima, Japan

[73] Assignees: Taiho Pharmaceutical Co., Ltd., Tokyo; Kotai Kasei Co., Ltd., Kodama, both of Japan

[21] Appl. No.: 241,667

[22] Filed: May 12, 1994

Related U.S. Application Data

[63] Continuation of Ser. No. 746,656, Aug. 8, 1991, abandoned, which is a continuation-in-part of Ser. No. 582,174, Sep. 20, 1990, abandoned.

[30] Foreign Application Priority Data

Jun. 2, 1989 [JP] Japan ..................... 64-28299

[51] Int. Cl.$^6$ ............... A61K 31/715; C08B 37/00; C07H 1/00
[52] U.S. Cl. ............... 514/54; 536/17.2; 536/17.5; 536/54; 536/118; 536/123; 536/124
[58] Field of Search ............... 514/54; 536/17.2, 536/17.5, 118, 54, 122, 124, 123

[56] References Cited

U.S. PATENT DOCUMENTS 4,629,699 12/1986 Bianchini ............... 536/18.7
5,063,210 11/1991 Lange, III et al. ............... 514/54

FOREIGN PATENT DOCUMENTS 2098232 11/1982 United Kingdom .

OTHER PUBLICATIONS

The Journal Of biological Chemistry, vol. 263, No. 34, 5th Dec. 1988, pp. 18176–18183, The American Society for Biochemistry and Molecular Biology, Inc., U.S.; R. P. Vieira et al.

(List continued on next page.)

*Primary Examiner*—Douglas W. Robinson
*Assistant Examiner*—Everett White
*Attorney, Agent, or Firm*—Nikaido, Marmelstein, Murray & Oram

[57] ABSTRACT

The present invention provides a sulfated polysaccharide (D-HG), a pharmaceutically acceptable salt thereof, a process for preparing the same and a medicament containing the same as the effective component for DIC (disseminated intravascular coagulation) and thrombosis, the sulfated polysaccharide (D-HG) being prepared by depolymerization of FGAG (a sulfated polysaccharide extracted from a body wall of a sea cucumber with such activities as those of heparin) or a salt thereof and having the following physicochemical properties:

[1] Molecular weight:
  3,000 to 42,000 (as measured by high performance GPC)
[2] Characteristic:
  white, amorphous, highly hygroscopic powder
[3] Solubility:
  soluble in water but insoluble in ethanol, acetone and like organic solvents
[4] Specific rotation:
  $[\alpha]_D^{20} = -55$ to $-73°$ (C=1%)
[5] Color reaction: as shown below

| | |
|---|---|
| Elson-Morgan reaction | + |
| Carbazole-sulfuric acid reaction | + |
| Cystein-sulfuric acid reaction | + |
| Orcinol-hydrochloric acid reaction | + |
| Azure A metachromasia reaction | + |

[6] Analysis for composition: as shown below
Galactosamine: Glucuronic acid: Fucose: sulfate= 1:0.8±0.2:0.85±0.15:3.4±0.9.

22 Claims, 12 Drawing Sheets

OTHER PUBLICATIONS

English Language Abstract of Japanese Document No. 61-22021 (A), Jan. 30, 1986.

English Language Abstract of Japanese Document No. 63-126981 (A), May 30, 1988.

1–Pharmacology, vol. 109, issued 1988, Zhang et al, "Anticoagulant effect of *Holothuria leucospilota* acid mucopolysaccharide", see p. 45, col. 2, the abstract No. 31852c, Zhongguo Yaolixue Yu Dulixue Zazhi 1988, 2(2), 98–101 (Ch).

1–Pharmacology, vol. 107, issued 1987, Shan et al, "Effects of an acid Polysaccharide from *Holothuria leucospilota* on the platelet aggregation in rabbits" see p. 45, col. 1, the abstract No. 190638n, Zhongguo Yaoli Xuebao 1987, 8 (5), 447–50 (Ch).

Chemical Abstracts, vol. 99, issued 1983, Fan et al, "Acidic Polysaccharides from *Holothuria leucospilota* (Brandt)", see p. 394, col. 2, the abstract No. 19901k, Yaoxue Xuebao 1983, 18(3), 203–8 (Ch).

63–Pharmaceutical, vol. 94, issued 1981, Fan et al, "Isolation of an acidic mucopolysaccharide from *Stichopus japonicus* selenka and some of its physical and chemical properties", see p. 357, col. 2, the abstract No. 52763m, Yao Hsueh Hsueh Pao 1980, 15(5), 263–70 (Ch).

SULFATED POLYSACCHARIDE, PHARMACEUTICALLY ACCEPTABLE SALT THEREOF, PROCESS FOR PREPARING SAME AND MEDICAMENT CONTAINING SAME AS EFFECTIVE COMPONENT

This application is a continuation of application Ser. No 07/746,656 filed Aug. 8, 1991, now abandoned, which is a continuation-in-part application of our application Ser. No. 07/582174 filed Sep. 20 1990, now abandoned, which is the entry into the U.S. National Phase of PCT application PCT/JP90/00141 filed on Feb. 6, 1991.

TECHNICAL FIELD

The present invention relates to a novel sulfated polysaccharide, a pharmaceutically acceptable salt thereof, a process for preparing the same and a medicament containing the same as an effective component.

BACKGROUND ART

The present inventors separated a sulfated polysaccharide from the body wall of a sea cucumber by extraction with alkali, the sulfated polysaccharide having an anti-coagulation activity and a lipid clearing activity which are typical of heparin. The inventors named the polysaccharide FGAG (Yao Hsueh 1980, 15(5), 263–270, Zhongyao Tongbao 1982, 7(4), 27–29, Hsueh Pao 1983, 18(3), 203–208 and Japanese Unexamined Patent Publication No.63-8001). Japanese Unexamined Patent Publication No.63-10601 discloses another example of the separation of sulfated polysaccharide by other researchers. Although differently named, the sulfated polysaccharides described in the above prior art publications are all identical and have the following physicochemical constants.

Characteristic:

white, amorphous, highly hygroscopic powder
Molecular weight:

about 15,000 to about 80,000 (as measured by gel filtration)
Analysis for composition: As shown below.

| Galactosamine | 13 to 17 wt. % |
| Glucuronic acid | 16 to 19 wt. % |
| Fucose | 13 to 27 wt. % |
| Sulfate | 27 to 38.5 wt. % |

Molar ratio is as shown below.

Galactosamine: glucuronic acid: fucose: sulfate=1:1±0.2:1.35±0.35:3.6±0.6

According to the above analytical values and the like, FGAG is identified as a high-molecular weight sulfated polysaccharide comprising galactosamine, glucuronic acid, fucose, etc. and is characterized by a larger content of sulfate than known natural sulfated polysaccharides.

With a high anti-coagulation activity, said FGAG was once a candidate for a medicament for curing disseminated intravascular coagulation (DIC). However, FGAG was later found to have a high activity to cause platelet aggregation when used for human beings and to be useless in treatment of humans' DIC if used as it is because of such side effect.

DISCLOSURE OF THE INVENTION

In view of the above situation, the present inventors conducted extensive research on compounds which can be used as an excellent medicament for treatment of DIC and which have activities like heparin's. Our finding was that the sulfated polysaccharide prepared by depolymerization of FGAG or a salt thereof exhibits substantially no activity to cause platelet aggregation while sustaining the anti-coagulation activity and other activities like heparin's. We further discovered that unlike heparin, the sulfated polysaccharide show an activity to inhibit the production of thrombin without displaying an anti-Xa or anti-thrombin activity, and thus may be potentially effective in treatment of thrombosis. The present inventors named the novel sulfated polysaccharide D-HG. The present invention has been accomplished based on these novel findings.

According to the invention, there are provided a novel sulfated polysaccharide (D-HG), and a pharmaceutically acceptable salt thereof, a process for preparing the same and a medicament for treatment of DIC and thrombosis containing the above as the effective component.

D-HG of the invention has the physicochemical properties shown below.

[1] Molecular weight:
  3,000 to 42,000 (as measured by high performance GPC)

[2] Characteristic:
  white, amorphous, highly hygroscopic powder

[3] Solubility:
  soluble in water but insoluble in ethanol, acetone and like organic solvents.

[4] Specific rotation:
  $[\alpha]_D^{20}$=−55 to −73° (C=1%)

[5] Color reaction: As shown below

| Elson-Morgan reaction | + |
| Carbazole-sulfuric acid reaction | + |
| Cysteine-sulfuric acid reaction | + |
| Orcinol-hydrochloric acid reaction | + |
| Azure A metachromasia reaction | + |

[6] Analysis for composition:
  D-HG comprises constituent saccharides including galactosamine (abbreviated to GalN), glucuronic acid (abbreviated to GA) and fucose (abbreviated to Fuc) and sulfate in a molar ratio of Gain:GA:Fuc:sulfate= 1:0.8±0.2:0.85±0.15:3.4±0.9.

Analyses were conducted by the following methods to check galactosamine, glucuronic acid, fucose and sulfate.

GalN:
  White method (Carbohydrate Research, 114: 586, 201)

GA:
  Bitter-Muir method (Anal. Blochem., 4: 330, 1962)

Fuc:
  Dische method (J. Biol. Chem., 175: 595, 1948)

Sulfate:
  Dodgson & Price method (Biochem. J., 84: 106, 1962)

The above analytic results show that D-HG has in the molecule sulfate and carboxyl group which react with bases to form a salt. D-HG is stable in the form of a salt and isolated and purified usually in the form of a salt. Usable as salts are pharmaceutically acceptable salts including salts of potassium, sodium or like alkali metals, and salts of calcium, magnesium, barium or like alkaline earth metals, or pyridinium salt or like organic bases. Shown below is the composition of constituent saccharides in a form in which a salt is not formed, i.e., in free form.

| | |
|---|---|
| GalN | 18 to 24 wt. % |
| GA | 14 to 21 wt. % |
| Fuc | 13 to 20 wt. % |
| Sulfate | 31 to 44 wt. % |

A preferred molecular weight of D-HG and a salt thereof is about 4,000 to about 15,000 (as determined by high performance GPC). The structure of the D-HG of the invention is determined by DQF-COSY, HOHAHA and like proton correlation two dimensional NMR.

Detailed condition of purification procedure and NMR spectrum determination is shown in Example 21.

The structure of the D-HG of the invention can be represented by the formula (A).

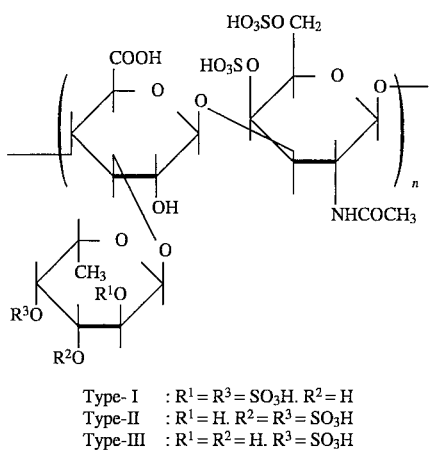

Type-I   : $R^1 = R^3 = SO_3H$, $R^2 = H$
Type-II  : $R^1 = H$, $R^2 = R^3 = SO_3H$
Type-III : $R^1 = R^2 = H$, $R^3 = SO_3H$ More specifically, the D-HG of the invention contains Type-I, Type-II and Type-III.

In the above formula (A), n is in the range of 5 to 30, preferably 10 to 26, more preferably 16 to 24.

In the D-HG of the invention, the ratio of Type-I: Type-II: Type-III is in the range of $5:2.4\pm1.0:0.9\pm0.3$, preferably $5:3.1\pm0.3:1.0\pm0.2$. D-HG of the invention is prepared from FGAG as a-starting material. For preparation of D-HG, FGAG or a salt thereof is depolymerized, followed by isolation and purification. FGAG is obtained by decomposing the body wall of a sea cucumber, an oceanic life, with alkali, and further decomposing the resulting product with pancreatin or like proteolytic enzymes for extraction, followed by isolation and purification.

FGAG or a salt thereof for use in the preparation of-D-HG of the invention-can be easily produced by the methods disclosed in the known publications cited above in reference to the prior art, more specifically for example by the method to be described later in Reference Example. Examples of sea cucumbers useful in the preparation of FGAG or a salt thereof are:

*Stichopus japonicus* Selenka,
*Stichopus chloronoyus* Brandt,
*Stichopus variegatus* Semper,
*Holothuria pervicax* Selenka,
*Holothuria atra*,
*Holothuria argus*,
*Holothuria edulis*,
*Holothuria scabra*,
*Parastichopus nigripunctatus*,
*Thelenota ananas*,
*Holothuria monacarla* Lesson,
*Holothuria leucospilota* Brandt,
*Cucumaria chronhjelmi*,
*Cucumaria echinata*,
*Cucumaria frondosa* Japonica,
*Pentacta australis*,
*Paracaudina chilensis ransonneti*,
*Molpadia musculus*,
*Leptosynapta inhaerens*,
*Polvcheira rufescens*,
*Synapta maculata*,
*Halodeima cinerascens* (Brandt),
*Actinopyga lacanora* (Jaeger),
*Actinopyga echinites* (Jaeger),
*Microthele nobills* (Selenka), etc.

The sea cucumber to be used as the starting material may be a raw or dried one. Of the sea cucumbers exemplified above, Stichopus japonicus Selenka is most preferred as the starting material.

D-HG is prepared by dissolving the above-obtained FGAG or a salt thereof in water and depolymerizing the solution. In the depolymerization reaction, a high-molecular weight sulfated polysaccharide such as heparin or the like is converted into a low-molecular weight sulfated polysaccharide. A depolymerizing agent is usually used in the reaction. Examples of useful depolymerizing agents are hydrogen peroxide, hypochlorous acid, hypobromus acid, sodium hypochlorate and like hypohalogenous acids and salts thereof; periodic acid, sodium periodate and like periodic acids and salts thereof, etc. Ascorbic acid, ferrous ion or the like is usable as a reaction accelerator. Optionally, the depolymerization reaction may be effected by application of radiations such as ultrasonic waves, ultraviolet rays, gamma rays or the like alonein-lieu of a depolymerizing agent or in combination with the above depolymerizing agent. The most preferred depolymerization method in the invention is one using hydrogen peroxide as a depolymerizing agent. Hydrogen peroxide is reacted in an amount of 1 to 31 wt. %, preferably 1 to 16 wt. % in terms of a hydrogen peroxide concentration. The reaction time is usually 1 to 60 hours, preferably 3 to 40 hours, and the reaction temperature ranges from room temperature to about 80° C., preferably about 40 to about 60° C. The pH range in the reaction of hydrogen peroxide is acidic or neutral in the range of from 1 to 8, preferably 3 to 7. To maintain a constant pH value, hydrogen peroxide may be reacted in a buffer such as acetate buffer, phosphate buffer, Tris buffer or the like, or a pH controller using diluted sodium hydroxides-or the like may be used in the reaction. On completion or the reaction, the pH is returned to neutral range, and isolation and purification are conducted. The isolation and purification can be done, for example, by fractional precipitation using an organic solvent such as ethanol, acetone or the like; acetate such as potassium acetate, barium acetate, calcium acetate, ammonium acetate or-the like; or quaternary ammonium salt such as cetyltrimethyl ammonium salt or the like. The isolation and purification is also feasible by ion exchangechromatography using resins such as DEAE-Cellulose (product of Sigma Chemical Co.), DEAE-Toyopearl (product of Tosoh Corporation), DEAE-Cellulofine (product of Chisso Corporation), Dowex-1 (product of Dow Chemical Co.) or the like, or gel filtration chromatography using resins such as Sephadex G-50, Sephadex G-200 (both products of Pharmacia-LKB Biotechnology), by dialysis using Spectra/Por(product of Spectrum-Medical Industries, Inc.) or by ultrafiltration. These means are employed alone or in a suitable combination thereof. Ion exchange chromatography, gel filtration chromatography and ultrafiltration are preferable to produce easily D-HG having no activity to cause platelet aggregation.

The thus obtained D-HG is usually isolated in the form of a salt of sodium and/or potassium or the like. D-HG in a salt form can be transformed into free D-HG by treatment with a cation-exchange resin such as Dowex 50W or the like. D-HG in a salt form, if necessary, can be converted into a desired pharmaceutically acceptable salt by salt exchange commonly employed. Usable as salts of sulfated polysaccharides are pharmaceutically acceptable salts including salts of potassium, sodium or like alkali metals, and salts of calcium, magnesium, barium or like alkaline earth metals, or pyridinium salt or like organic bases.

The treatment of DIC and thrombosis by D-HG of the invention is conducted utilizing its anti-coagulation activity against the acceleration of coagulation in blood vessels which causes DIC and thrombosis. The range of anti-coagulation activity of D-HG includes an activity to inhibit the platelet aggregation by thrombin as well as an anti-coagulation enzyme activity, typically an activity to prolong the activated partial thromboplastin time. The anti-coagulation activity of D-HG is entirely different from heparin's in that D-HG does not require any plasma factor such as anti-thrombin III in exhibiting the activity nor is influenced by the anti-heparin factor such as platelet factor 4. A further difference from heparin is that D-HG has an activity to inhibit the production of thrombin without displaying an anti-Xa activity or an anmit-thrombin activity, hence apparently effective against thrombosis. The feature of D-HG is that unlike heparin and FGAG, D-HG has substantially no activity to cause platelet coagulation, which is the fatal activity of medicaments for treatment of DIC and thrombosis. The expression "substantially no activity to cause platelet coagulation" means that when administered to organisms, especially human beings, D-HG does not exhibit platelet coagulation which poisons organisms or aggravates thrombosis.

D-HG is made into various pharmaceutical compositions useful for DIC and thrombosis treatment. Stated more specifically, the composition comprising an effective amount of D-HG and/or a pharmaceutically acceptable salt and a pharmaceutically acceptable carrier can be prepared in various administration forms. The administration form can be any of tablets, capsules, powders, granules, grains, solutions, emulsions, suspensions and like oral forms, and injections, suppositories, ointments, plasters and like parenteral forms. These preparations can be manufactured by conventional methods already known to those skilled in the art. A solid preparation for oral administration can be prepared by mixing the effective component of the invention with an excipient with or without addition of binders, disintegrators, lubricants, coloring agents, flavorings, perfumes, etc. and making the mixture into tablets, capsules, powders, granules, grains or the like in a conventional manner. Injection preparations can be produced by adding a pH-adjusting agent, buffer, stabilizer, isotonizing agent, local anesthetic and the like to the effective component, and making the mixture into intravenous, intramuscular, subcutaneous, intracutaneous or intraperitoneal injections in a conventional manner. Suppositories can be prepared by making a mixture of the effective component, base materials and optionally a surfactant and the like into a suppository in a conventional manner.

Examples of excipients useful for oral solid preparations are lactose, sucrose, starch, talc, magnesium stearate, crystalline cellulose, methyl cellulose, carboxymethyl cellulose, glycerin, sodium alginate, gum arabic, etc. Examples of binders useful for oral preparations include polyvinyl alcohol, polyvinyl ether, ethyl cellulose, gum arabic, shellac, sucrose, etc. Examples of useful lubricants are magnesium stearate, talc and the like. The coloring agents, disintegrators and other auxiliaries to be added include those commonly used in the art. Tablets may be coated by well-known methods.

Examples of base materials useful for suppositories include oily base materials such as macrogol, lanolin, cacao oil, fatty acid triglyceride, Witepsol (registered trademark for the product of Dynamite Nobel) and so on.

The amount of the effective component per each unit dosage varies with the symptoms of the patient to be given she preparation, the form of the preparation, etc. Usually a preferred amount is 10 to 200 mg. in an oral preparation, 1 to 100 mg in an injection, or 10 to 100 mg in a suppository, per unit dosage. The daily clinical dosage of the composition of the invention also varies with the patient's age, sex, conditions and other factors but usually may be in the range of about 10 to about 1,000 mg, preferably about 50 to about 200 mg in terms of the effective component and can be given at 1 to 4 divided doses.

According to the present invention, there is provided a novel sulfated polysaccharide, D-HG, having substantially no activity to cause platelet coagulation and having an excellent anti coagulation activity and remarkable characteristics as a medicament for treatment of DIC and thrombosis.

BEST MODE FOR CARRYING OUT THE INVENTION

The present invention will be described below in greater detail with reference to Reference Example, Examples and Pharmacological Tests. The percentages in Reference Example and Examples are all by weight.

REFERENCE EXAMPLE 1

Preparation of FGAG

One kilogram of dried Stichopus japonicus was immersed in 10 l of warm water and left to swell overnight. The flesh was removed and homogenized. Potassium hydroxide was added in an amount to give a 1N mixture. The mixture was treated at 60° C. for 100 minutes and adjusted to a pH of 8.5. After addition of 50 g of pancreatin, the mixture was stirred at 50° C. for 3 hours.

After removal of impurities by centrifugation, 4.3 l of ethanol was added to the residue. The mixture was allowed to stand at 4° C. and the resulting precipitate was collected. The precipitate was washed with 80% ethanol, anhydrous ethanol and acetone in this sequence, and dried under reduced pressure, giving 50 g of a crude product. Fifty grams of the crude product was dissolved in 3.5 l of water and the solution was centrifuged to remove the insolubles. To the supernatant were added 5% sodium chloride and 40% ethanol to give a precipitate. The precipitate was collected by centrifugation. After the precipitate was dissolved in 2.5 l of water, the solution was adjusted to a pH of 10.5. To the solution was added dropwise a 30% aqueous solution of hydrogen peroxide. The mixture was decolorized in a water bath at 50° C. with heating for about 3 hours. After cooling, the insolubles were removed by centrifugation. To the supernatant was added about 490 g of potassium acetate and the mixture was kept at 4° C. overnight. The following day, the resulting precipitate was dissolved in 2 l of water, the solution was cooled to 0° C., and the pH was adjusted to 2.8. The insolubles were removed from the solution by centrifugation. After neutralizing the supernatant, 196 g of potassium acetate was added. The mixture was allowed to stand at 4° C. to give a precipitate, which was then collected by centrifugation. The precipitate was dissolved in water to give a solution having a potassium acetate concentration of 0.5M and the solution was left overnight at 4° C. The precipitate was collected by centrifugation, washed with 40% methanol and dissolved in 1 l of water. To the solution were added 5% sodium chloride and 40% ethanol to give a precipitate. The precipitate was collected by centrifugation, washed with 80% methanol, anhydrous ethanol and acetone in this sequence, and dried under reduced pressure, giving 17 g of a FGAG sodium/potassium salt. The physicochemical constants of the salt are as follows.

Molecular weight:
55,000 (as determined by high performance GPC)
Analysis for composition: As shown below

| | |
|---|---|
| GalN: | 20.0% |
| GA: | 18.6% |
| Fuc: | 17.2% |
| Sulfate: | 36.6% |
| Na: | 6.2% |
| K: | 7.4% |

EXAMPLE 1

Ten grams of the FGAG sodium/potassium salt obtained in Reference Example 1 was dissolved in 75 ml of water and 25 ml of a 30% aqueous solution of hydrogen peroxide was added. While maintaining the solution at a pH of about 7 with a diluted sodium hydroxide solution using a pH controller, the solution was heated at 60° C. for 12 hours. After cooling, 2% sodium chloride and 40% ethanol were added to give a precipitate. The precipitate was collected by centrifugation, washed with 80% ethanol, anhydrous ethanol and acetone in this sequence, and dried under reduced pressure, giving 7.15 g of a D-HG sodium/potassium salt.

EXAMPLE 2

A 6.95 g quantity of a D-HG sodium/potassium salt was prepared by the same procedure as in Example 1 with the exception of treatment with hydrogen peroxide for 24 hours.

EXAMPLE 3

A D-HG sodium/potassium salt was prepared by the same procedure as in Example 1 with the exception of conducting the reaction while maintaining the pH of about 4 with a diluted alkali solution. Yield 6.4 g.

EXAMPLE 4

Ten grams of the FGAG sodium/potassium salt obtained in Reference Example 1 was dissolved in 83.3 ml of a 0.2M phosphate buffer (pH 7.0). To the solution was added 16.7 ml of a 30% aqueous solution of hydrogen peroxide. The mixture was treated at 60° C. for 12 hours. After cooling, 2% sodium chloride and 40% ethanol were added to give a precipitate. The precipitate was collected by centrifugation, washed with 80% ethanol, anhydrous ethanol and acetone in this sequence, and dried under reduced pressure, giving 7.18 g of a D-HG sodium/potassium salt.

EXAMPLE 5

A D-HG sodium/potassium salt was prepared by the same procedure as in Example 4 with the exception of conducting the reaction using a 0.2M acetate buffer (pH 3.5). Yield 7.05 g.

EXAMPLE 6 AND 7

Two grams of the FGAG sodium/potassium salt obtained in Reference Example 1 was dissolved in 15 ml of water. To the solution was added 5 ml of a 30% aqueous solution of hydrogen peroxide, and the mixture was treated at 60° C. for 14 hours (Example 6) or 40 hours (Example 7). After cooling, the mixture was adjusted to a pH of 7 to 8 and thoroughly dialyzed against water using Spectra/por 3. The mixture was lyophilized and dried under reduced pressure. In this way, 1.62 g and 1.76 g of D-HG sodium/potassium salts were prepared.

EXAMPLE 8

Two grams of the FGAG sodium/potassium salt obtained in Reference Example 1 was dissolved in 16.7 ml of water. To the solution was added 3.3 ml of a 30% aqueous solution of hydrogen peroxide, and the mixture was treated at 45° C. for 24 hours. After cooling, the mixture was returned to a pH of about 7 after which 2% sodium chloride and 40% ethanol were added to provide a precipitate. The precipitate was collected by centrifugation, washed with 80% ethanol, anhydrous ethanol and acetone in this sequence, and dried under reduced pressure, giving 1.41 g of a D-HG sodium/potassium salt.

EXAMPLE 9 TO 12

Two grams of the FGAG sodium/potassium salt obtained in Reference Example 1 was dissolved in 15 ml of water. To the solution was added 5 ml of a 30% aqueous solution of hydrogen peroxide, and the mixture was treated at 60° C. for 4, 8, 12 or 24 hours. After cooling, the mixture was adjusted to a pH of 7 to 8 and fully dialyzed against water using Spectra/por 3. The same treatment as in Example 8 followed. In this way, 1.42 g, 1.35 g, 1.35 g and 1.2 g of D-HG sodium/potassium salts were produced.

EXAMPLES 13 AND 14

Two grams of the FGAG sodium/potassium salt obtained in Reference Example 1was dissolved in 14.7 ml of water. To the solution was added 5.3 ml of a 30% aqueous solution of hydrogen peroxide. The mixture was treated at 45° C. for 14 hours or 40 hours. After cooling, the mixture was returned to a pH of about 7 after which 2% sodium chloride and 40% ethanol were added to give a precipitate. The same treatment as in Examples 6 to 7 followed. In this way, 1.64 g and 1.62 g of D-HG sodium/potassium salts were prepared.

EXAMPLE 15

Two grams of the FGAG sodium/potassium salt obtained in Reference Example 1 was dissolved in 30 ml of water and treated for 12 hours in the same manner as in Example 8. The solution was fractionated with a solution of sodium chloride on a Sephadex G-50T column (product of Pharmacia-LKB Biotechnology). While monitoring uronic acid, peaks were divided into three. The eluate obtained last was collected, fully dialyzed against water, lyophilized and dried under reduced pressure, giving 0.2 g of a D-HG sodium salt.

EXAMPLE 16

A 0.5 g quantity of the D-HG sodium/potassium salt obtained in Example 8 was fractionated in the same manner as in Example 15, giving 0.18 g of a D-HG sodium salt.

FIG. 1 shows an infrared absorption spectrum of the D-HG sodium salt (as measured with KBr tablet) and FIG. 2 shows a proton nuclear magnetic resonance spectrum (in $D_2O$, 90 MHz, 70° C.) thereof.

EXAMPLE 17

Two grams of the FGAG sodium/potassium salt obtained in Reference Example 1 was dissolved in 16.7 ml of water, and 3.3 ml of a 30% aqueous solution of hydrogen peroxide was added. The mixture was treated at 45° C. for 5 hours. After cooling, the mixture was returned to a pH of about 7 after which 2% sodium chloride and 40% ethanol were added to give a precipitate. The precipitate was collected by centrifugation, washed with 80% ethanol, anhydrous ethanol and acetone in this sequence, and dried under reduced pressure, giving a D-HG sodium/potassium salt. Yield 1.60 g.

EXAMPLE 18

Two grams of the FGAG sodium/potassium salt obtained in Reference Example 1 was treated for 9 hours by the same method as in Example 7, giving 1.54 g of a D-HG sodium/potassium salt.

EXAMPLE 19

Two grams of the FGAG sodium/potassium salt obtained in Reference Example 1 was treated for 12 hours by the same method as in Example 17, giving 1.52 g of a D-HG sodium/potassium salt.

EXAMPLE 20

One gram of the FGAG sodium/potassium salt obtained in Reference Example 1 was dissolved in 8.7 ml of 0.2M phosphate buffer (pH 7.0). To the solution was added 1.3 ml of a 30% aqueous solution of hydrogen peroxide and the mixture was treated at 60° C. for 3 hours. After cooling, 5% sodium chloride and 66% ethanol were added to the mixture to give a precipitate. The precipitate was collected by centrifugation, washed with 80% ethanol, anhydrous ethanol and diethyl ether in this sequence, and dried under reduced pressure, giving a D-HG sodium/potassium salt. The obtained salt was dissolved in 10 ml of 20 mM Tris-HCl buffer (pH 7.0) and the solution was admixed with DEAE-Toyopearl (product of Tosoh Corporation) thoroughly equilibrated with the buffer. Elution was conducted in the buffer with a linear concentration gradient of sodium chloride (0 to 1M). While monitoring uronic acid, peak fractions were collected and precipitation occurred with addition of a two-fold amount of ethanol. The precipitate was collected by centrifugation, washed with 80% ethanol, anhydrous ethanol and diethyl ether in this order and dried under reduced pressure, giving a D-HG sodium salt. Yield 0.39 g.

EXAMPLE 21

A dried Stichopus japonicus was pulverized, and the thus obtained 5.0 kg of pulverized Stichopus japonicus was treated with use of a Soxhlet's extractor using 10 l of acetone. The residue was dried, giving about 4.6 kg of pulverized and degreased Stichopus japonicus.

A 534 g quantity of potassium acetate was dissolved in 27.2 l of water. A 4.0 kg quantity of pulverized Stichopus japonicus after degreased was added thereto and the resulting mixture, was heated to 70° C., followed by addition of 32 g of protin (product of Daiwa Kako Kabushiki Kaisha). One hour after the addition, 30 g of protin was further added. Two and a half hours after the addition, the resulting mixture was treated by boiling and centrifuged to remove the insoluble matters. Thereafter, 1.2 l of water was added and 640 g of sodium chloride was dissolved. A 6.4 l quantity of ethanol was added and the resulting mixture was allowed to stand in a cool place overnight. The precipitate thus obtained was separated and collected. The precipitate was dissolved in 4.4 l of water and the pH of the solution was adjusted to 2.5 using an aqueous solution of hydrochloric acid. The solution was centrifuged with cooling to remove the insoluble matters. To the supernatant was added 1.5 kg of potassium acetate, and the resulting mixture was stirred in a cool place overnight. The resulting precipitate was collected by centrifugation. The precipitate was washed sequentially with 1.6 l of 2M aqueous solution of potassium acetate and with 2 l of an aqueous solution of 2% sodium chloride and 35% of ethanol. The precipitate was further washed with 2 l of ethanol twice. The precipitate obtained was dissolved in 2.3 l of water, and 88 g of sodium borohydride and 108 g of potassium hydroxide were added. The mixture obtained was stirred at 60° C. for 50 minutes. The reaction mixture was cooled to room temperature and 1.6 l of ethanol, 0.5 l of acetic acid and 0.6 l of water were added. The pH of the obtained mixture was adjusted to 5.0 using acetic acid. The mixture was cooled to 4° C. and the precipitate obtained was collected by centrifugation with cooling. The precipitate obtained and 32 g of sodium chloride were dissolved in 1.2 l of water. A 0.5 l quantity of ethanol was added and the resulting mixture was allowed to stand in a cool place overnight. The precipitate was collected by centrifugation with cooling and washed sequentially with anhydrous ethanol and with acetone on a fritted-glass funnel. The precipitate was dried and dissolved in water again. A 18 g quantity of sodium hydroxide was added and 170 ml of 30% aqueous solution of hydrogen peroxide was added dropwise and the mixture obtained was reacted at room temperature for 40 minutes. The pH of the mixture was adjusted to 6.5 using 6N hydrochloric acid. A 40 g quantity of sodium chloride was added thereto and 1.2 l of ethanol was further added. The mixture obtained was allowed to stand at 4° C. overnight. On the next day, the precipitate formed was subjected to centrifugation with cooling to collect the insolubles. The precipitate was washed sequentially with ethanol and with acetone on a fritted-glass funnel. The resulting mass was dried under reduced pressure, giving 104 g of a FGAG sodium salt.

A 100 g quantity of the FGAG sodium salt was dissolved in 2.5 mM of a phosphate buffer solution (pH 7.0) to give 900 ml of a solution. Cuptic sulfate 5 hydrate (0.4 g) was added 100 ml of a 30% aqueous solution of hydrogen peroxide was further added and the resulting mixture was reacted at 40° C. for 3 hours. During the reaction, the pH of the reaction mixture was controlled with use of an automatic pH-controlling apparatus (pH 6.8 to 7.2) using 4N sodium hydroxide. The resulting mixture was caused to precipitate using 1% sodium chloride and 50% ethanol The precipitate obtained was collected by centrifugation. The precipitate was washed sequentially with 80% ethanol and with anhydrous ethanol and then dried under reduced pressure. Sodium borohydride was added to a 10% aqueous solution of a substance having a low molecular weight in an amount of 0.1% based on the amount of such substance. The resulting mixture was reacted at room temperature for 10 minutes. The insoluble matters obtained were subjected to precise filtration (size of pore: 0.45 μ) and removed. The filtrate was adjusted to a pH of 4.5 using 6N hydrochloric acid, neutralized and then caused to precipitate with 1% sodium chloride and 50% ethanol. The precipitate obtained was washed sequentially with 80% ethanol and with anhydrous ethanol, and then dried under reduced pressure, giving 85.4 g of crude DHG sodium salt.

A column (φ180×25) filled with activated DEAE Cellulofine A 800 (product of Chisso Co.) was equilibrated with 10 mM tris-hydrochloric acid buffer solution (pH 7.0). Crude D-HG sodium salt (80 g) was dissolved in 10 mM tris-hydrochloric acid buffer solution (pH 7.0) and placed onto the column filled with DEAE Cellutofine A 800. The column was thoroughly washed with the same buffer solution and thereafter 0.45M sodium chloride and 10 mM tris-hydrochloric acid buffer solution (pH 7.0) were applied to the column in an amount 4 times the volume of the column. Then 0.64M sodium chloride and 10 mM tris-hydrochloric acid buffer solution (pH 7.0) were applied to the column to obtain 1 l of each fraction. When each fraction was used for detection with respect to uronic acid, a single peak was found. The fractions were collected and concentrated by ultrafiltration (SlY3 Amicon). Ethanol was added to the concentrate in an amount equal to the concentrate and the resulting mixture was allowed to stand in a cool place overnight. The precipitate obtained was washed sequentially with 80% ethanol and anhydrous ethanol, followed by drying under reduced pressure to obtain 35.2 g of a D-HG sodium salt.

Determination method

NMR spectrum was determined at 70° C. with use of a nuclear magnetic resonance apparatus (Model GSX-400, manufactured by JEOL. Ltd.). All the signals of proton were reasonably assigned by such proton correlation two dimensional NMR as DQF-COSY (Double quantum filtered $^1$H-$^1$H correlation spectroscopy), HOHAHA (Homonuclear HartmanHahn spectroscopy).

The sequence of each sugar was determined based on the long-range coupling between $^1$H-$^{13}$C. $^{13}$C-NMR was assigned based on the correlation with the signal of proton by means of CH-COSY ($^1$H-$^{13}$C Correlation spectroscopy). The long-range coupling was evaluated by means of HMBC ($^1$H-Detected heteronuclear multiple bond connectivity) method.

The steric configuration of each sugar at the anomeric position was determined by C-H direct binding constant ($^1J_{1C-1H}$) and vicihal binding constant ($^3J_{1H-2H}$) of the anomeric protons. $^1J_{1C-1H}$ was determine by HMQC ($^1$H-Demected heteronuclear multiple quantum coherence) specmrum.

The spectra of D-HG were shown in FIG. 3 to FIG. 12.

The structure of the obtained D-HG was represented by the formula (A) wherein n was about 21.5. formula (A):

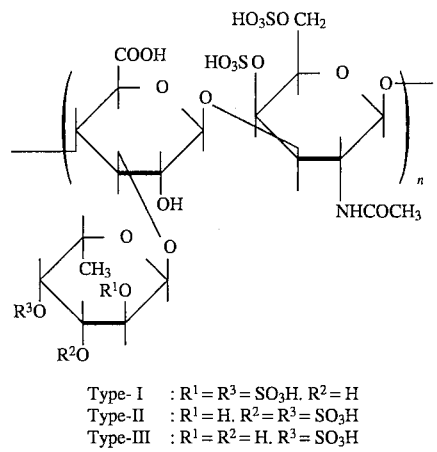

Type-I : $R^1 = R^3 = SO_3H$. $R^2 = H$
Type-II : $R^1 = H$. $R^2 = R^3 = SO_3H$
Type-III : $R^1 = R^2 = H$. $R^3 = SO_3H$ The obtained D-HG was the mixture of Type-I, Type-II and Type-III. The ratio of Type-I: Type-II: Type-III was about 5:3:1.

Table 1 shows physicochemical properties of D-HG's obtained in the above Examples.

TABLE 1

| Ex. | MW × 10³ | $[a]_D^{20}$ | Composition | | | | | | Molar ratio |
| | | | GalN | Fuc | GA | Sul* | Na | K | GalN:GA:Fuc:Sul* |
|---|---|---|---|---|---|---|---|---|---|
| 1 | 10.2 | −71.2 | 21.7 | 16.7 | 16.5 | 29.7 | 7.1 | 6.4 | 1:0.70:0.84:2.5 |
| 2 | 9.7 | −67.1 | 19.8 | 15.8 | 15.1 | 30.2 | 7.2 | 7.9 | 1:0.70:0.87:2.8 |
| 3 | 14.1 | −71.5 | 20.2 | 17.6 | 15.6 | 33.1 | 6.2 | 6.7 | 1:0.71:0.95:3.0 |
| 4 | 4.7 | −55.4 | 19.8 | 15.1 | 13.3 | 31.4 | 8.2 | 4.8 | 1:0.62:0.83:2.9 |
| 5 | 6.5 | −61.2 | 20.6 | 15.6 | 15.8 | 32.8 | 7.8 | 4.4 | 1:0.71:0.83:2.9 |
| 6 | 12.0 | −70.8 | 18.6 | 16.5 | 17.1 | 38.6 | 4.7 | 6.1 | 1:0.85:0.97:3.8 |
| 7 | 7.8 | −68.0 | 17.5 | 13.1 | 16.1 | 37.1 | 5.4 | 6.4 | 1:0.85:0.82:3.9 |
| 8 | 13.4 | −70.1 | 17.1 | 14.6 | 14.6 | 32.7 | 8.1 | 5.5 | 1:0.79:0.93:3.5 |
| 9 | 14.1 | −69.6 | 19.9 | 14.3 | 14.8 | 34.0 | 7.6 | 5.2 | 1:0.69:0.79:3.1 |
| 10 | 8.6 | −66.3 | 20.8 | 15.1 | 14.3 | 34.8 | 8.5 | 5.5 | 1:0.64:0.79:3.1 |
| 11 | 7.5 | −66.0 | 17.8 | 13.2 | 13.2 | 32.9 | 6.4 | 5.1 | 1:0.68:0.81:3.4 |
| 12 | 5.6 | −64.8 | 20.1 | 14.7 | 13.0 | 33.4 | 4.1 | 5.1 | 1:0.60:0.80:3.0 |
| 13 | 10.8 | −72.2 | 18.1 | 14.8 | 16.7 | 37.1 | 5.0 | 6.5 | 1:0.85:0.89:3.8 |
| 14 | 6.6 | −68.4 | 17.3 | 12.8 | 15.9 | 35.3 | 5.6 | 6.7 | 1:0.85:0.81:3.7 |
| 15 | 10.2 | −68.2 | 19.1 | 15.8 | 14.4 | 32.9 | 8.6 | 0 | 1:0.69:0.90:3.1 |

TABLE 1-continued

| | MW | | Composition | | | | | | Molar ratio |
|---|---|---|---|---|---|---|---|---|---|
| Ex. | × 10³ | $[\alpha]_D^{20}$ | GalN | Fuc | GA | Sul* | Na | K | GalN:GA:Fuc:Sul* |
| 16 | 7.7 | −67.5 | 17.6 | 13.9 | 14.1 | 32.1 | 4.4 | 0 | 1:0.74:0.86:3.3 |
| 17 | 41.4 | −70.7 | 19.8 | 14.7 | 15.8 | 29.9 | 5.9 | 5.5 | 1:0.73:0.81:2.7 |
| 18 | 24.3 | −72.6 | 18.0 | 15.9 | 16.6 | 33.4 | 6.2 | 5.2 | 1:0.85:0.96:3.4 |
| 19 | 20.1 | −71.1 | 18.3 | 14.4 | 14.8 | 33.0 | 7.5 | 5.0 | 1:0.75:0.86:3.3 |
| 20 | 12.8 | −62.4 | 19.3 | 14.5 | 16.2 | 34.3 | 10.7 | 0 | 1:0.78:0.81:3.3 |
| 21 | 19.0 | −71.1 | 17.9 | 15.2 | 17.0 | 39.3 | 12.3 | 1.2 | 1:0.88:0.93:4.0 |

Note: In Table 1, the molecular weight (MW) was determined by high performance GPC. Sul* stands for sulfate.

D-HG's obtained in Examples 1 to 21 showed single spots in electrophoresis (Dietrich. C. P., J. Chromatogr., 130, 299 (1977)).

PREPARATION EXAMPLE 1

Injection preparation

The D-HG sodium salt prepared in Example 16 was dissolved in distilled water for injection to give a 5% aqueous solution. A 50 mg quantity (in terms of D-HG) of the solution was filled into a vial to perform lyophilization. A 2 ml quantity of physiological saline was added as a solvent.

PREPARATION EXAMPLE 2

Injection preparation

An injection preparation was prepared according to the formulation as shown below.

| | |
|---|---|
| D-HG sodium/potassium salt (Example 12) | 40 mg |
| Physiological saline | q.s. |
| Per ampule | 2 ml |

PREPARATION EXAMPLE 3

Tablet

Tablets were prepared according to the formulation as shown below.

| | |
|---|---|
| D-HG sodium/potassium salt (Example 14) | 10 mg |
| Corn starch | 65 mg |
| Carboxymethyl cellulose | 20 mg |
| Polyvinyl pyrrolidone | 3 mg |
| Magnesium stearate | 2 mg |
| Per tablet | 100 mg |

PREPARATION EXAMPLE 4

Suppository

A suppository was prepared according to the formulation as shown below.

| | |
|---|---|
| D-HG sodium/potassium salt (Example 4) | 50 mg |
| Witepsol W-35 (Product of Dynamite-Nobel AG) | 950 mg |
| Per suppository | 1000 mg |

Pharmacological Test

<Effect on DIC model>

D-HG, FGAG and heparin were tested for an effect on DIC model in accordance with the method described in Japan J. Pharmacol, 35, 203–227 (1984).

Used as D-HG was the sodium salt obtained in Example 16, as FGAG the sodium/potassium salt obtained in Reference Example 1 and as a heparin a sodium salt having a potency of 185.6 U/mg.

A 800 U/kg of thrombin was intravenously injected into ICR mice (10 to 15 mice a group). After 24 hours, the fatality of mice caused by DIC was observed to calculate the survival rate. The D-HG sodium salt, FGAG sodium/potassium salt or heparin sodium salt was intravenously injected one minute before the administration of thrombin. Table 2 shows the results.

TABLE 2

| Medicament | Dose (mg/kg) | Survival rate (%) |
|---|---|---|
| Control | 0 | 13 |
| D-HG sodium salt | 3 | 90 |
| | 1 | 60 |
| | 0.3 | 40 |
| FGAG sodium/potassium salt | 1 | 60 |
| Heparin sodium salt | 1 | 80 |

D-HG produced the same anti-DIC effect as heparin and FGAG when used in an amount of 1 mg/kg. This model also serves as a thrombosis model, hence effective against thrombosis.

<Anti-coagulation Activity>

The D-HG sodium salt (Example 16) or D-HG sodium/potassium salt (Example 11) was added to citric acid-containing plasma obtained from a rabbit to a concentration of 10 μg/ml. The activity to prolong the activated partial thromboplastin time (APTT) against the control (physiological saline) was observed. Table 3 shows the results.

TABLE 3

| Medicament | APTT (Δ sec) |
|---|---|
| Ex. 16 | 24.7 |
| Ex. 11 | 16.2 |

TABLE 3-continued

| Medicament | APTT (Δ sec) |
|---|---|
| Control | 0.0 |

D-HG exhibited a remarkable anticoagulation activity.

<Anti-coagulation Activity in Human>

Using the citric acid-containing plasma obtained from more than 6 normal persons, the D-HG sodium salt (Example 16), a FGAG sodium/potassium salt and a heparin sodium salt were each observed for the activity in respect of anticoagulation parameters (μg/ml). Table 4 shows the results.

x2APTT shows the concentration (μg/ml) required to double the activated partial thromboplastin time of the control (without addition of a medicament).

$IIaIC_{90}$ is a concentration (μg/ml) for 90% inhibition of thrombin activity which was calculated by measuring the activity to prolong the thrombin time.

$XaIC_{50}$ is a medicament concentration (μg/ml) for 50% inhibition of decomposition of synthetic substrate S2222 with a factor X.

VIII $IC_{80}$ is a medicament concentration (μg/ml) for 80% inhibition of factor VIII which was calculated by measuring the activity to prolong the contact-activated coagulation time in the presence of a small amount of factor VIII using a factor VIII deficient plasma.

IIaGI is the concentration (μg/ml) required to double the control's time for complete inactivation of prothrombin in the contact-activated plasma. This represents an activity to inhibit the thrombin generation.

TABLE 4

| Medicament | x2APTT | $IIaIC_{90}$ | $XaIC_{50}$ | VIII $IC_{80}$ | IIaGI |
|---|---|---|---|---|---|
| Heparin sodium salt | 1.2 | 0.3 | 3.4 | 0.79 | 1.2 |
| FGAG sodium/ potassium salt | 2.4 | 2 | 5200 | 1.68 | 2.4 |
| Ex. 16 | 12.0 | 30 | 5100 | 4.77 | 12.0 |

As seen from the APTT prolonging activity, D-HG sodium salts have an anti-coagulation activity, but unlike heparin sodium salts, have substantially no anti-thrombin activity or anti-factor Xa activity. On the other hand, D-HG sodium salts show an activity to inhibit the thrombin generation, which confirms that the salts have an anti-thrombosis activity. This activity is presumably due to the inhibition of factor VIII activity and the inhibition of positive feedback mechanism of coagulation cascade. The above indicate that D-HG is a remarkably unique agent for treatment of DIC or thrombosis.

<Inhibitory Activity against Thrombin-induced Platelets Aggregation>

The result of addition of the D-HG sodium salt obtained in Example 16 or a heparin sodium salt having a potency of 185.6 U/mg was evaluated by observing the aggregation of platelets (expressed in an increase of light transmittance) caused by the addition of 0.1 U/ml of thrombin to a suspension of plasma-free washed platelet obtained from a rabbit. Table 5 shows the results.

TABLE 5

| Medicament | Concentration (μg/ml) | Light transmittance (%) |
|---|---|---|
| Control | 0 | 86.6 |
| D-HG sodium salt | 3 | 46.4 |
|  | 10 | 5.2 |
| Heparin sodium salt | 3 | 80.2 |

D-HG, unlike heparin, showed a remarkable inhibitory activity against thrombin aggregation in a plasma-free system. Thus, it was confirmed that the activity of D-HG is independent of the plasma factors such as ATIII, etc.

<Activity to Cause Platelets Aggregation in Human>

A citrated platelet-rich plasma was obtained from five normal persons (B, E, G, H, J). The D-HG sodium salt obtained in Example 16 or FGAG sodium/potassium salt obtained in Reference Example 1 was added to the plasma, and the resulting activity to cause platelet aggregation (expressed in an increase of light transmittance) was evaluated by observation. Table 6 shows the results.

TABLE 6

| Medicament | Concentration (mg/ml) | Light transmittance (%) | | | | |
|---|---|---|---|---|---|---|
| | | B | E | G | H | J |
| D-HG sodium salt | 1 | 1.2 | 2.5 | 3.8 | 3.0 | 1.3 |
| FGAG sodium/ potassium salt | 0.3 | 20.9 | 83.8 | 48.2 | 65.4 | 77.4 |
| Control | — | 2.4 | 1.3 | 2.3 | 1.8 | 2.4 |

D-HG did not have an activity to cause platelet aggregation in a concentration of 1 mg/ml, but FGAG exhibited an activity to cause platelet aggregation in a lower concentration of 300 μg/ml.

Figure 1:
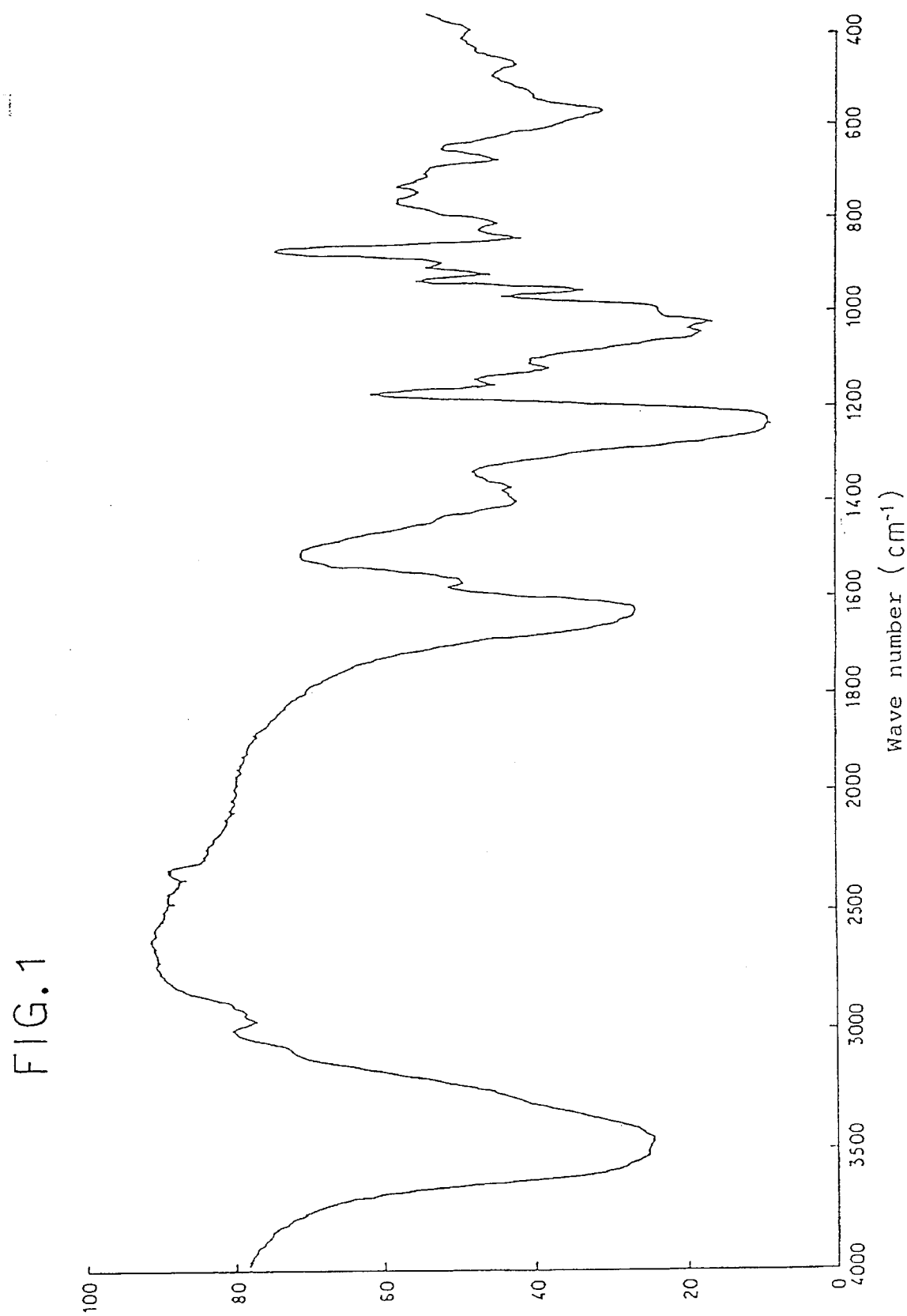
FIG. 1 shows the infrared absorption spectrum of the D-HG sodium salt prepared in Example 16.
Figure 2:
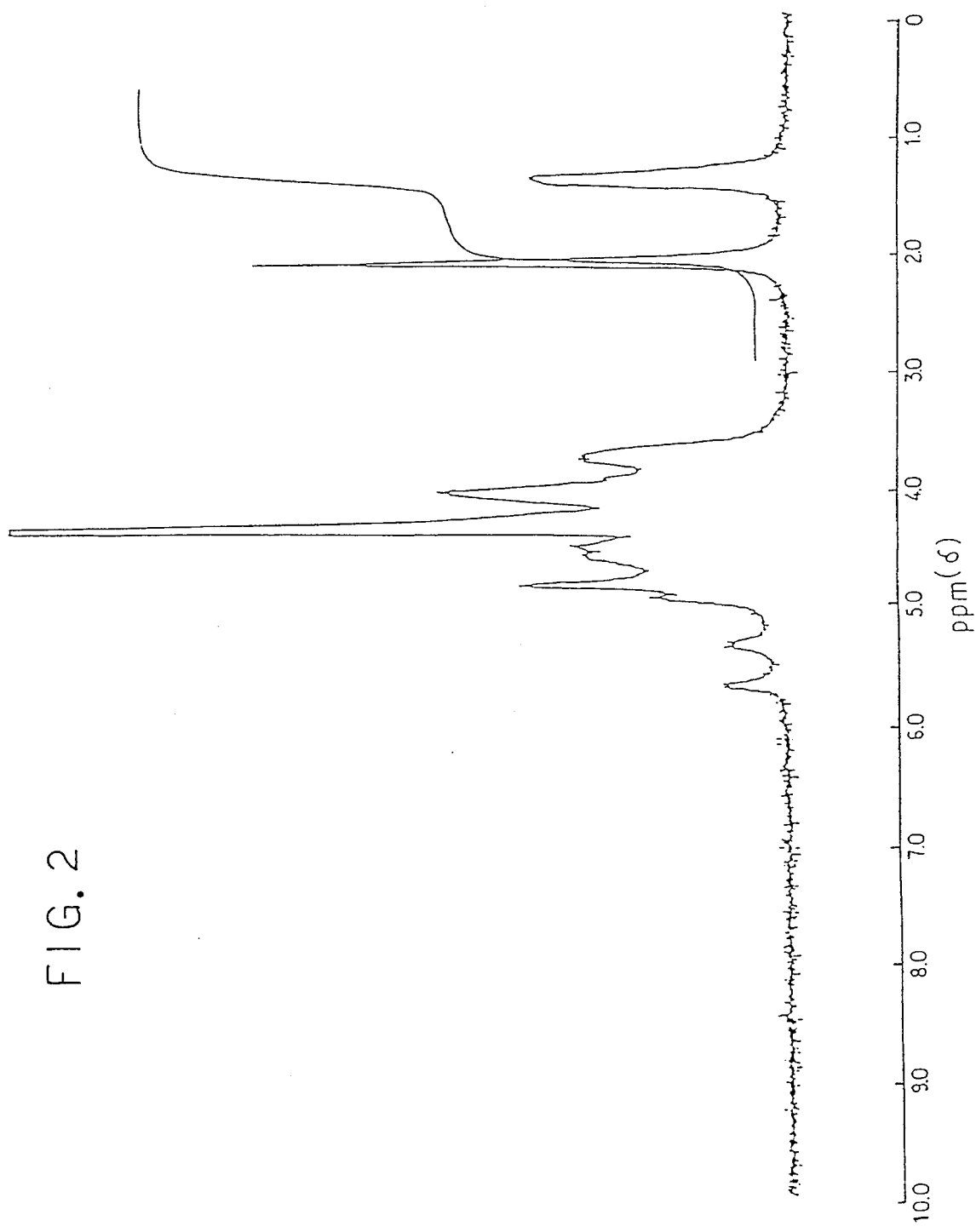
FIG. 2 shows the $^1$H-NMR of the D-HG sodium sale prepared in Example 16.
Figure 3:
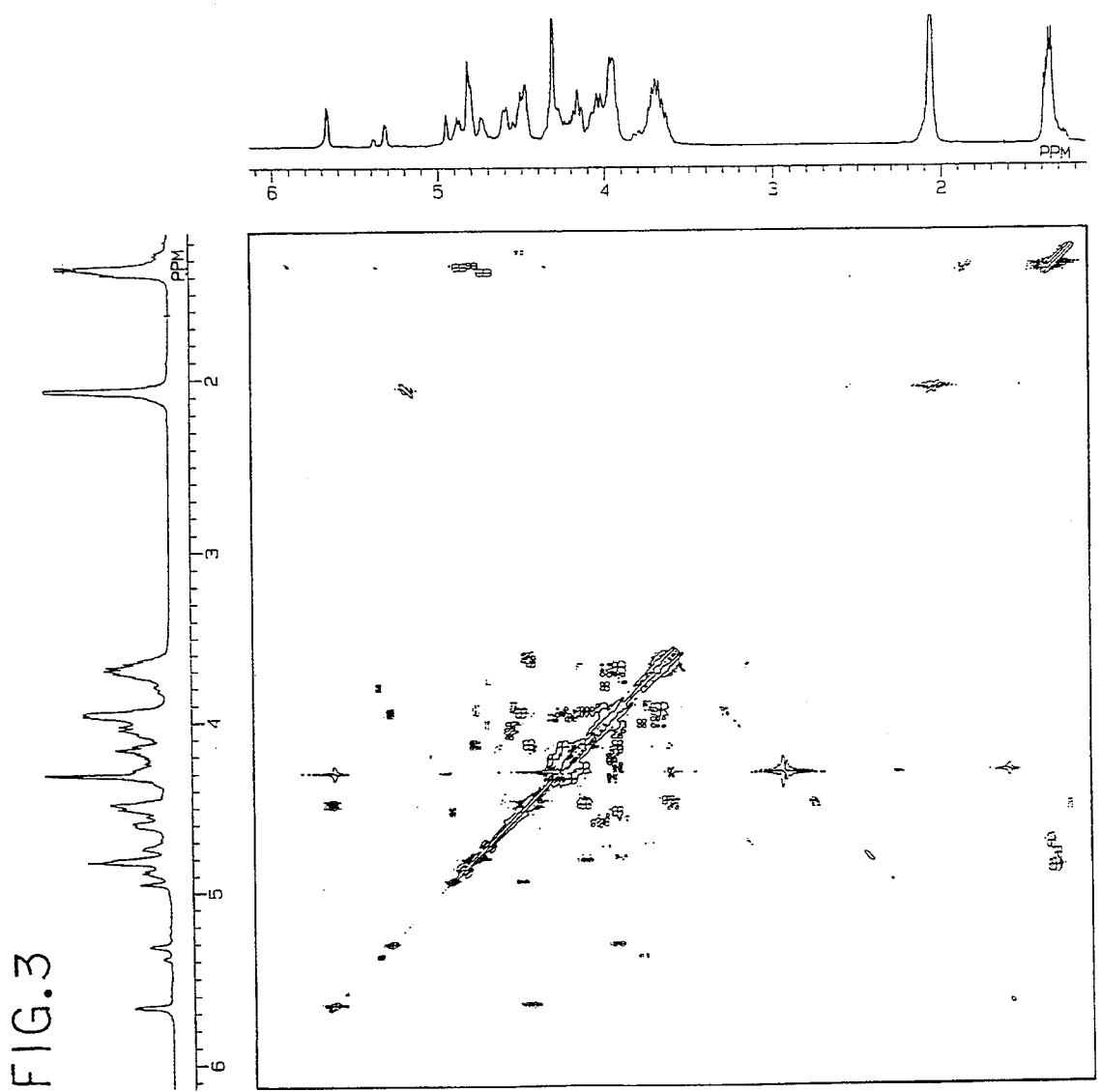
FIG. 3 shows the DQF-COSY spectrum of the D-HG prepared in Example 21.
Figure 4:
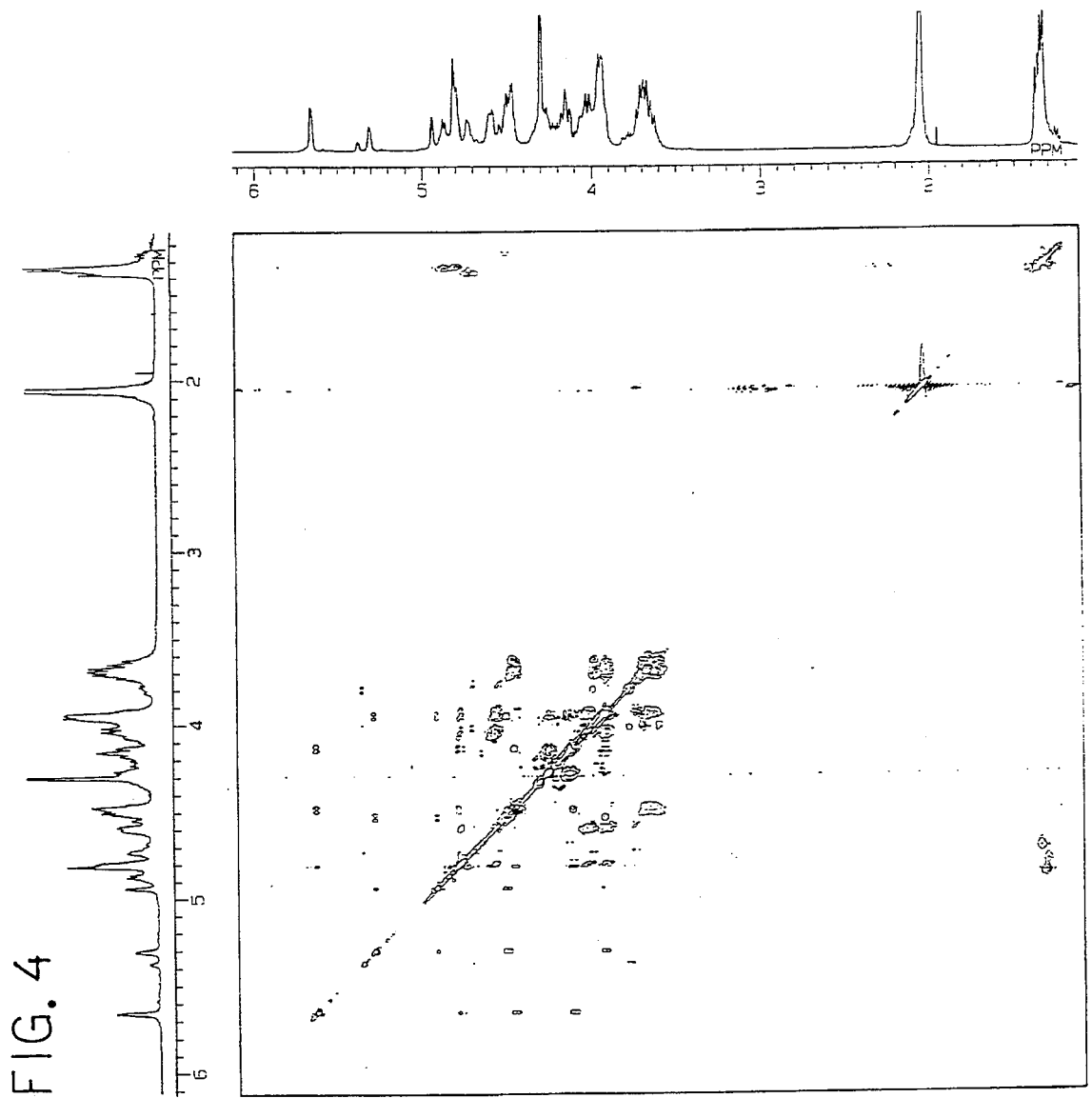
FIG. 4 shows the HOHAHA spectrum of the D-HG prepared in Example 21.
Figure 5:
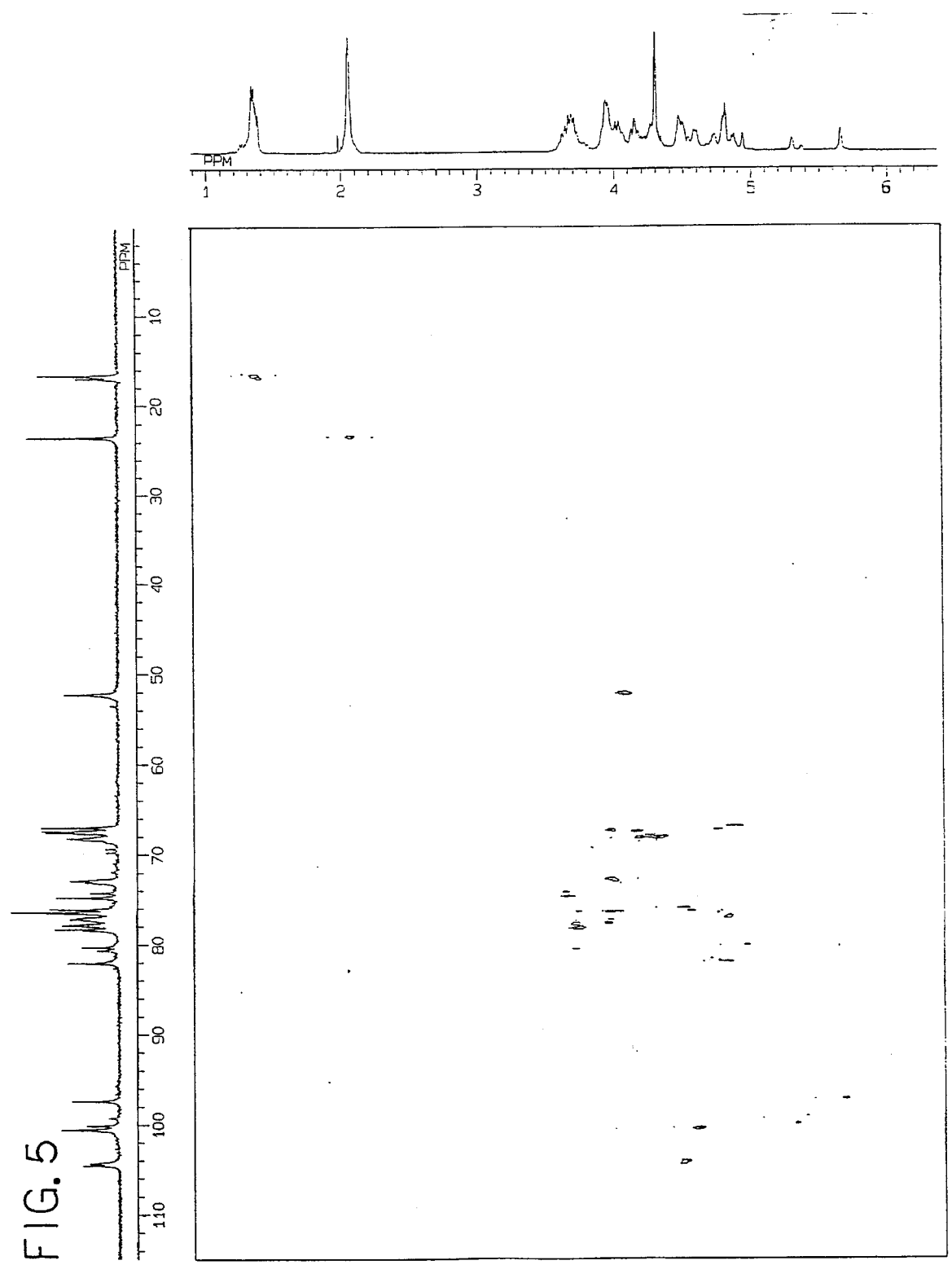
FIG. 5 shows the CH-COSY spectrum of the D-HG prepared in Example 21.
Figure 6:
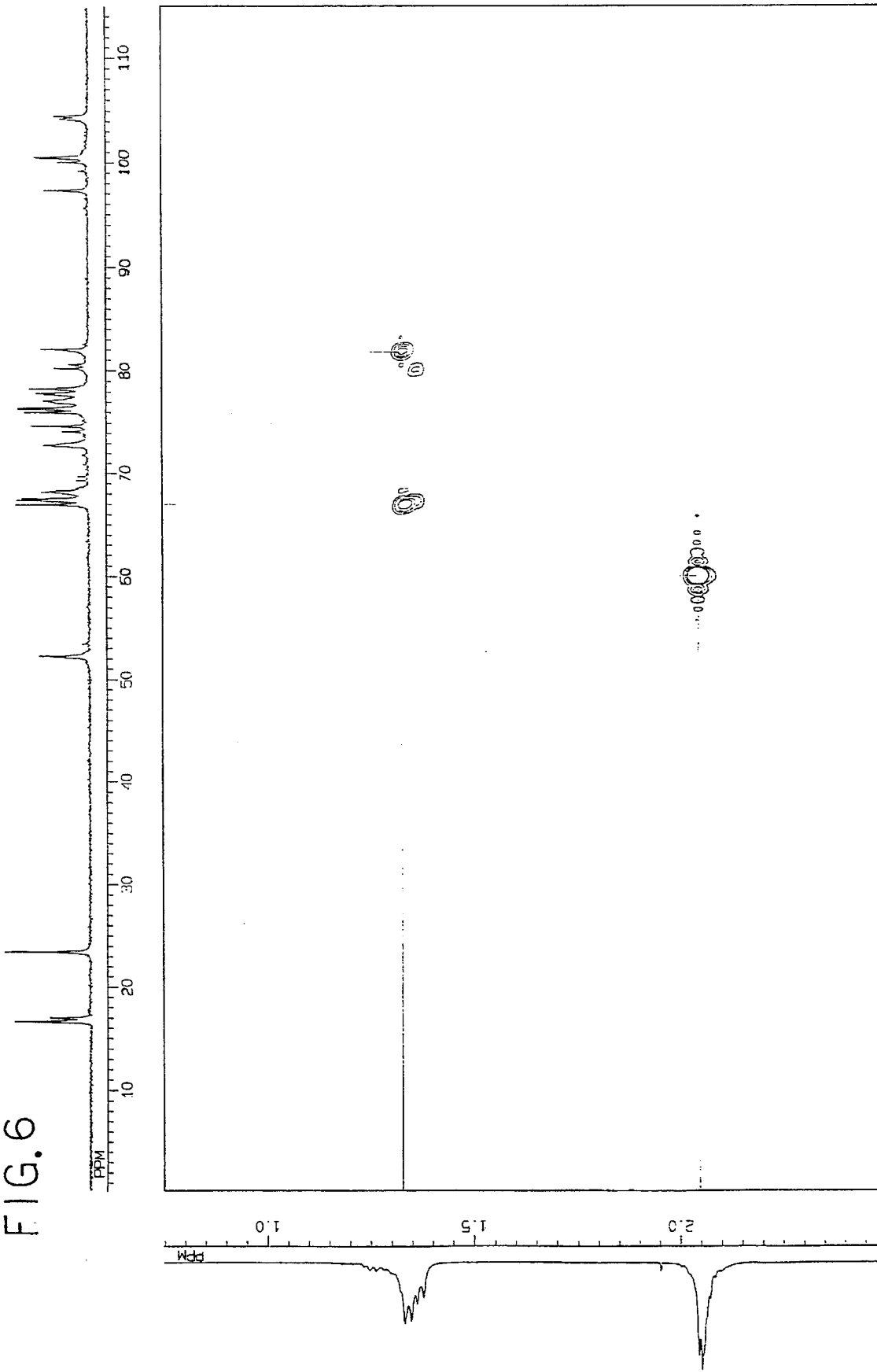
FIG. 6 shows the HMBC spectrum ($^1$H: about 0.75–2.5 PPM) of the D-GH prepared in Example 21.
Figure 7:
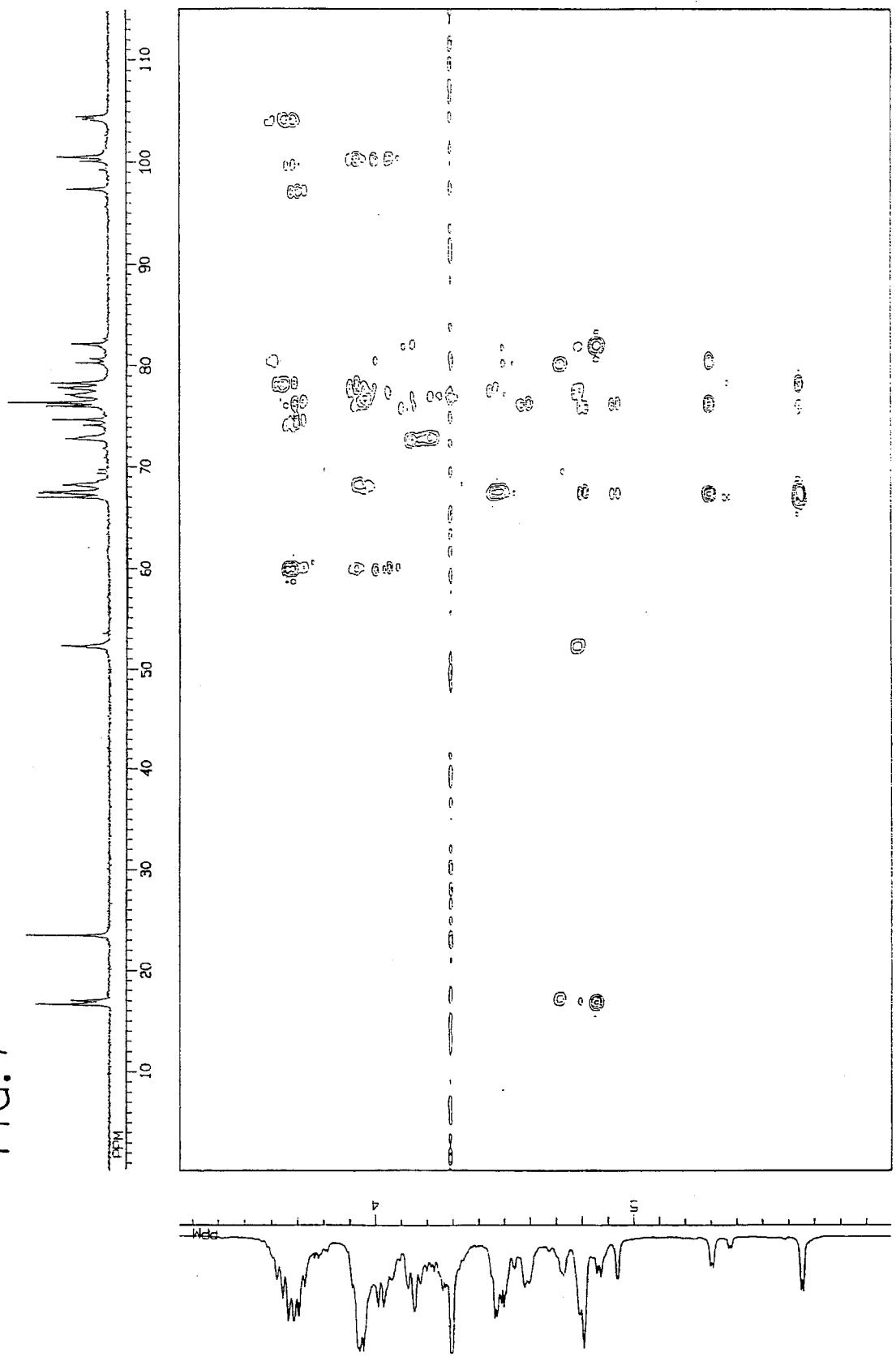
FIG. 7 shows the HMBC spectrum ($^1$H: about 3.2–6.0 PPM) of the D-HG prepared in Example 21.
Figure 8:
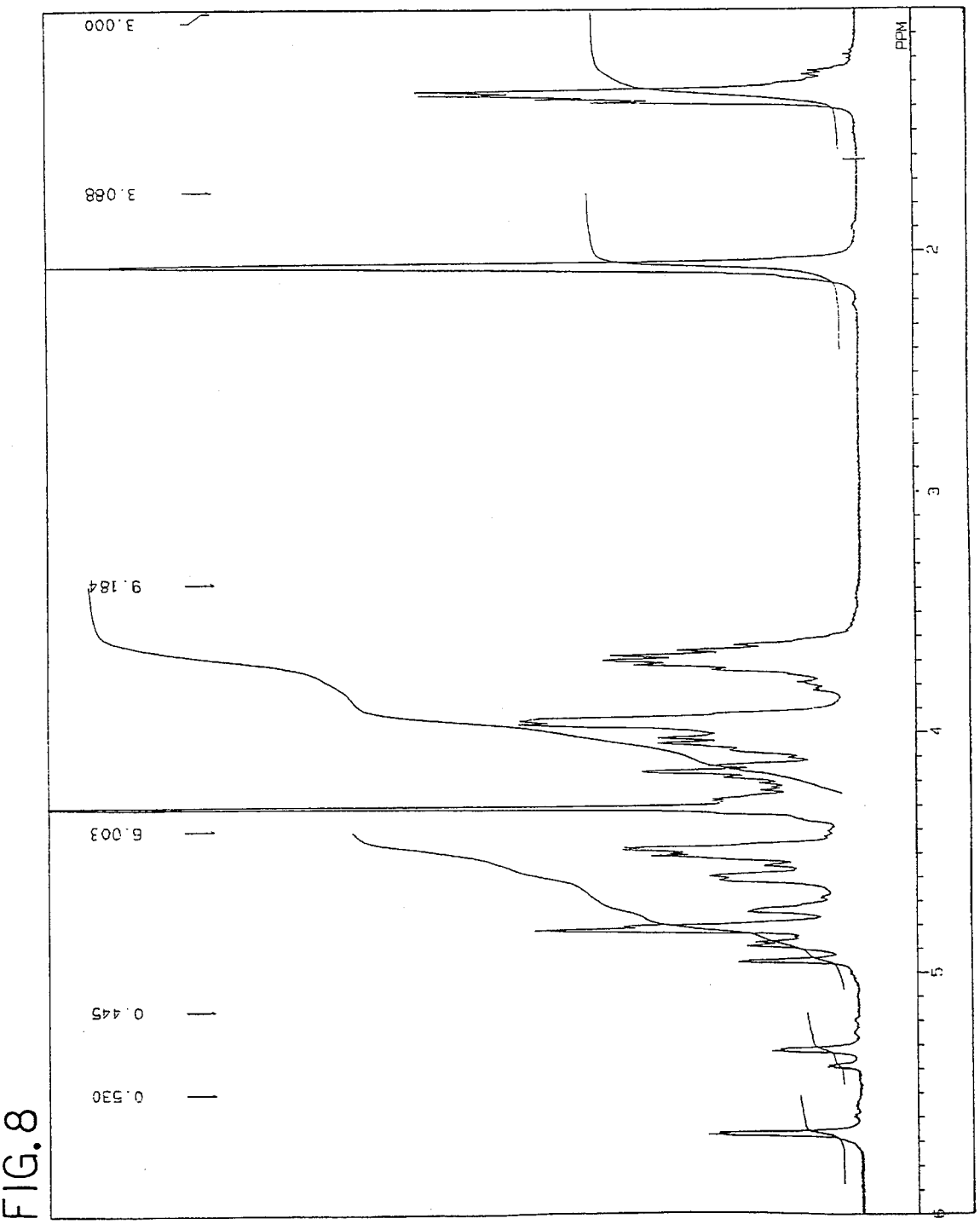
FIG. 8 shows $^1$H-NMR spectrum of the D-HG prepared in Example 21.
Figure 9:
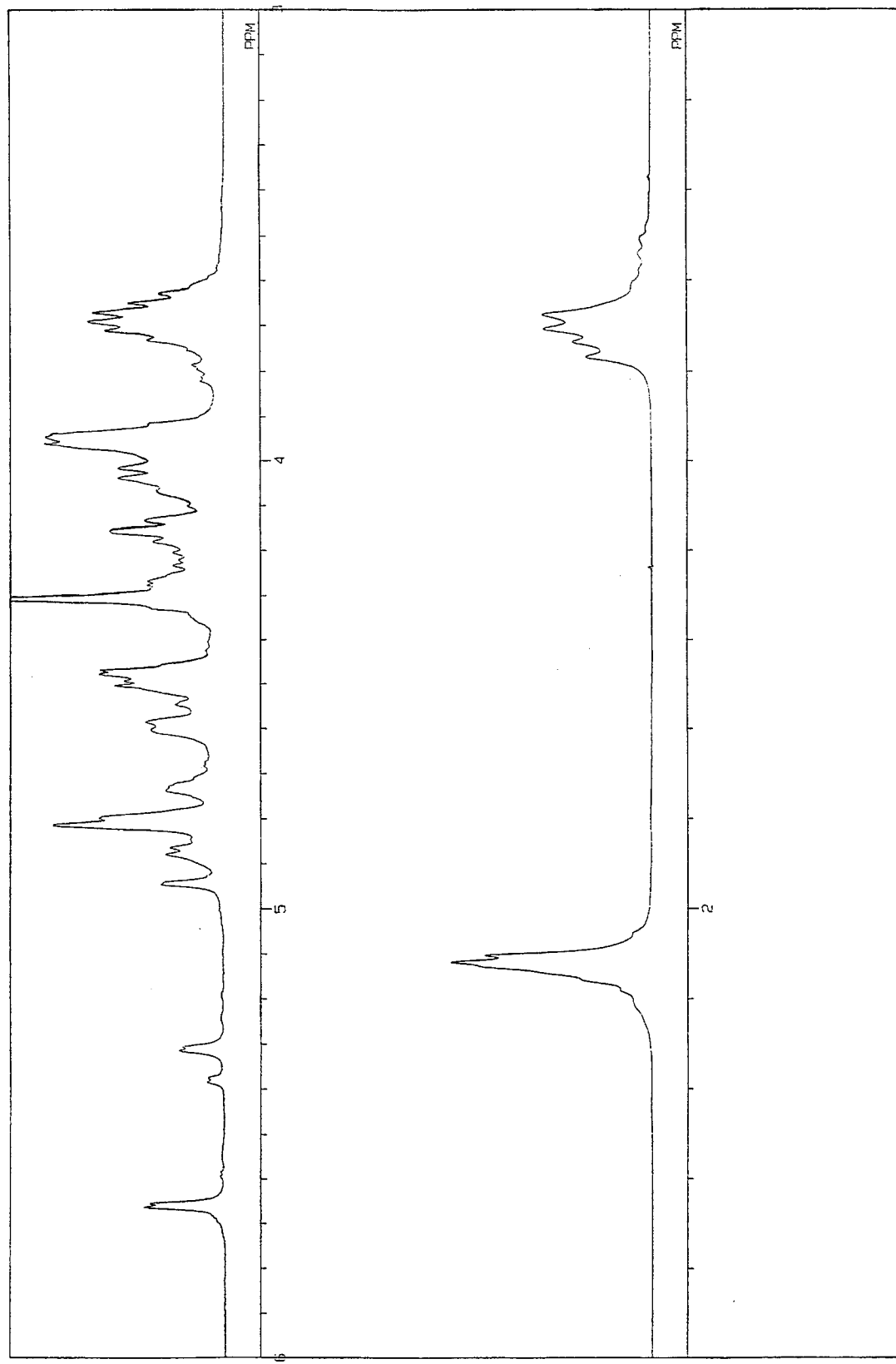
FIG. 9 shows the expanded $^1$H-NMR spectrum of the D-HG prepared in Example 21.
Figure 10:
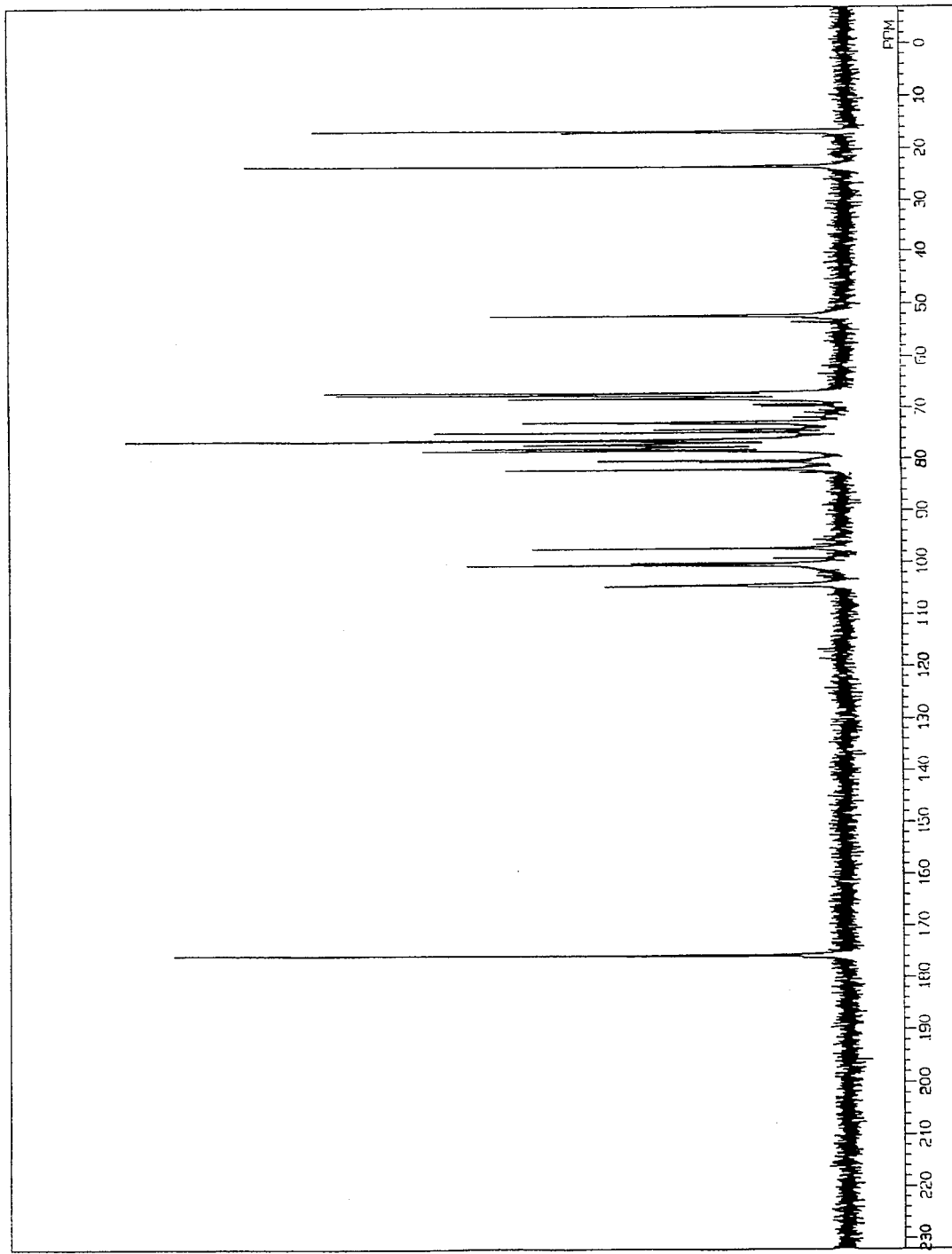
FIG. 10 shows the $^{13}$C-NMR spectrum of the D-HG prepared in Example 21.
Figure 11:
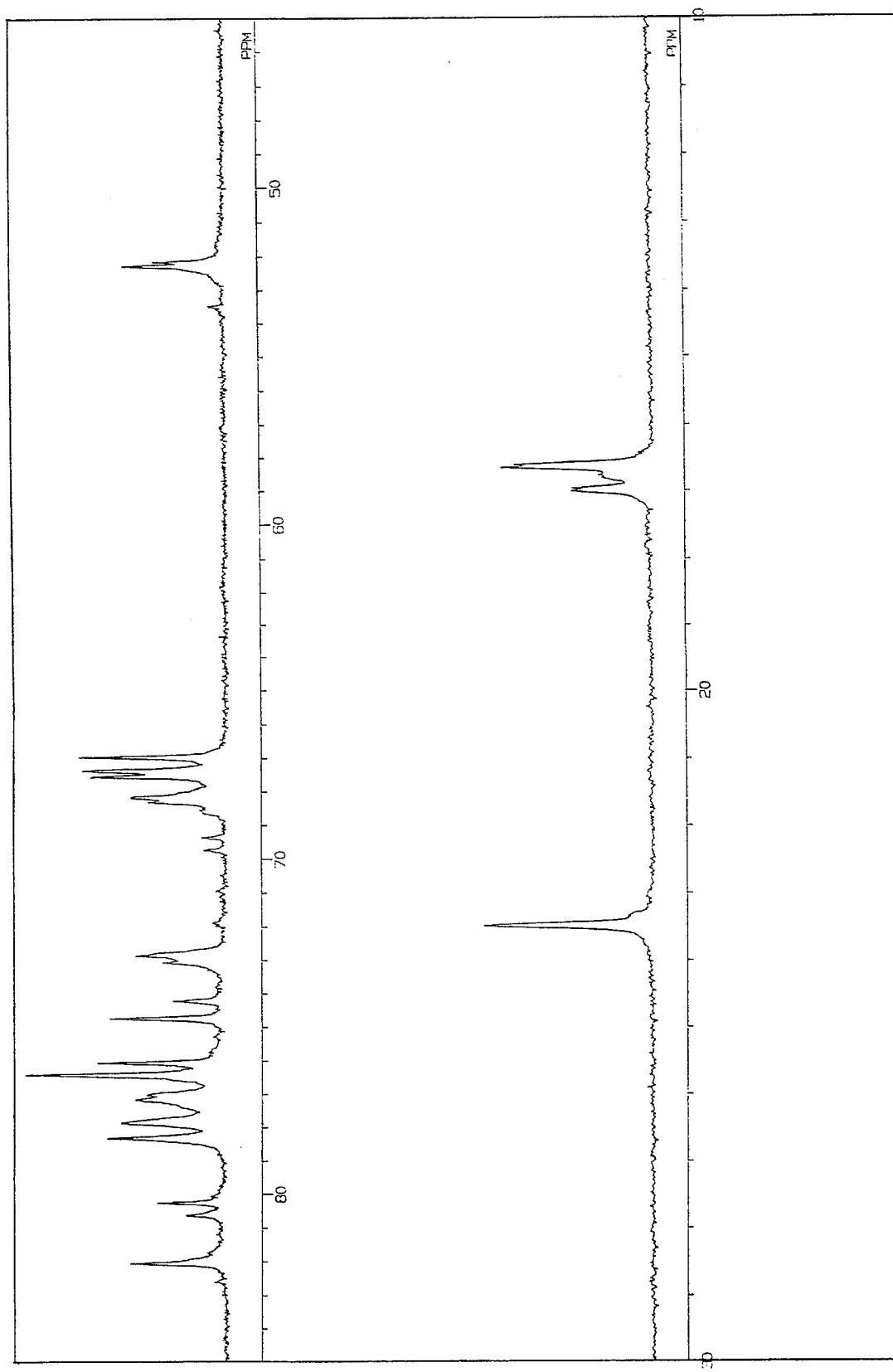
FIG. 11 shows the expanded $^{13}$C-NMR (1) spectrum of the D-HG prepared in Example 21.
Figure 12:
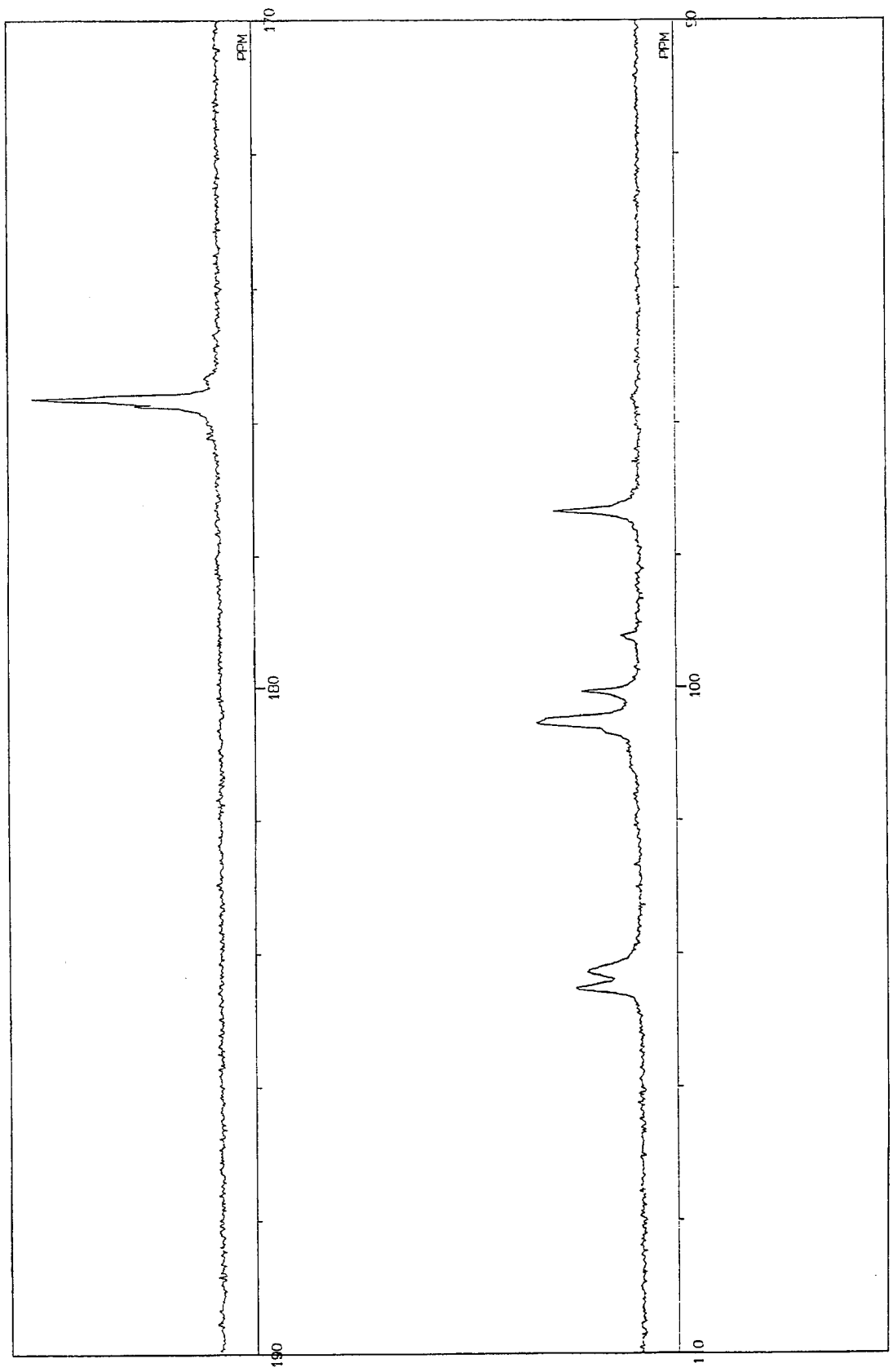
FIG. 12 shows expanded $^{13}$C-NMR (2) spectrum of the D-HG prepared in Example 21.

We claim:

1. Depolymerized sulfated polysaccharide, or a pharmaceutically acceptable salt thereof, said sulfated polysaccharide having been obtained from the body wall of a sea cucumber or a salt thereof, said depolymerized sulfated polysaccharide having substantially no activity to cause platelet aggregation and having the following physicochemical properties:

[1] Molecular weight:
   4,000 to 15,000 daltons (as measured by high performance GPC)
[2] Characteristic:
   white, amorphous, highly hygroscopic powder
[3] Solubility:
   soluble in water but insoluble in ethanol and acetone
[4] Specific rotation:
   $[\alpha]_D^{20} = -55$ to $-73°$ (C=1%)
[5] Color reaction: as shown below

| | |
|---|---|
| Elson-Morgan reaction | + |
| Carbazole-sulfuric acid reaction | + |
| Cysteine-sulfuric acid reaction | + |
| Orcinol-hydrochloric acid reaction | + |
| Azure A metachromasia reaction | + |

[6] Analysis for composition: as shown below
Galactosamine: Glucuronic acid: Fucose: Sulfate= 1:0.8±0.2:0.85±0.15:3.4±0.9.

2. The depolymerized sulfated polysaccharide or salt thereof according to claim 1 wherein said sulfated polysaccharide or a salt thereof is a sulfated polysaccharide having a molecular weight of about 15,000 to about 80,000 daltons as measured by gel filtration.

3. The depolymerized sulfated polysaccharide or salt thereof according to claim 2 wherein said sulfated polysaccharide has a composition comprising galactosamine 13 to 17 wt. %, glucuronic acid 16 to 19 wt. %, fucose 13 to 27 wt. %, sulfate 27 to 38.5 wt. %.

4. The depolymerized sulfated polysaccharide or salt thereof according to claim 3 wherein said sulfated polysaccharide or a salt thereof has a molar ratio of galactosamine: glucuronic acid: fucose:sulfate of about 1:1±0.2:1.35±0.35:3.6±0.6.

5. A process for preparing a depolymerized sulfated polysaccharide having the physicochemical properties according to claim 1 or a salt thereof the process comprising the steps of:
   depolymerizing sulfated polysaccharide or a salt thereof by the addition of a depolymerizing agent selected from the group consisting of hydrogen peroxide, hypochlorous acid, hypobromous acid, sodium hypochlorite, periodic acid and sodium perivdate or by the application of ultrasonic waves, ultraviolet rays, or gamma rays, alone or used in combination with the depolymerizing agent; and
   separating and purifying the resulting product by (i) fractional precipitation in the presence of acetate, organic solvent or a combination of acetate and organic solvent, (ii) gel filtration or (iii) ion exchange.

6. The process according to claim 5 wherein the separation and purification are carried out by fractional precipitation using potassium acetate, ethanol or a combination of potassium acetate and ethanol.

7. The process according to claim 5 wherein the separation and purification are carried out by a gel filtration.

8. The process according to claim 5 wherein the separation and purification are carried out by an ion exchange.

9. The process according to claim 5 wherein said sulfated polysaccharide or a salt thereof is a sulfated polysaccharide having a molecular weight of about 15,000 to about 80,000 daltons as measured by gel filtration.

10. The process according to claim 9 wherein said sulfated polysaccharide has a composition comprising galactosamine 13 to 17 wt. %, glucuronic acid 16 to 19 wt. % fucose 13 to 27 wt. %, sulfate 27 to 38.5 wt. %.

11. The process according to claim 10 wherein said sulfated polysaccharide or a salt thereof has a molar ratio of galactosamine: glucuronic acid: fucose:sulfate of about 1:1±0.2:1.35±0.35:3.6±0.6.

12. A pharmaceutical composition comprising an anti-coagulating effective amount of the depolymerized sulfated polysaccharide or the salt thereof according to claim 1 and a pharmaceutically acceptable carrier.

13. A method for treating disseminated intravascular coagulation in a mammal comprising:
   administering an anti-coagulating effective amount of the composition of claim 12 to said mammal.

14. A method for treating thrombosis in a mammal comprising:
   administering an anti-coagulating effective amount of the composition of claim 12 to said mammal.

15. A sulfated polysaccharide or a pharmaceutically acceptable salt thereof represented by the formula (A)

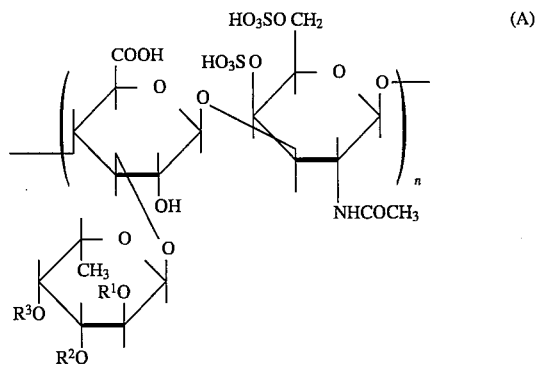

wherein repeating unit n is in the range of 5 to 30 and the repeating units are selected from the group consisting of Type-I in which $R^1$ and $R^3$ are $SO_3H$, and $R^2$ is H; Type-II in which $R^1$ is H, and $R^2$ and $R^3$ are $SO_3H$; Type-III in which $R^1$ and $R^2$ are H, and $R^3$ is $SO_3H$; and a combination of Type-I, Type-II and Type-III in a ratio in the range of 5:2.4±1.0:0.9±0.3.

16. The sulfated polysaccharide or pharmaceutically acceptable salt thereof according to claim 15 wherein the ratio of Type-I: Type-II: Type-III is in the range of 5:3.1±0.3:1.0±0.2.

17. The sulfated polysaccharide or pharmaceutically acceptable salt thereof according to claim 15 wherein n is in the range of 10 to 26.

18. The sulfated polysaccharide or pharmaceutically acceptable salt thereof according to claim 15 wherein n is in the range of 16 to 24.

19. A pharmaceutical composition comprising an anti-coagulating effective amount of the sulfated polysaccharide or the salt thereof according to claim 15 and a pharmaceutically acceptable carrier.

20. A method for treating disseminated intravascular coagulation in a mammal comprising administering an anti-coagulating effective amount of the composition of claim 15 to said mammal.

21. A method for treating thrombosis in a mammal comprising administering an anti-coagulating effective amount of the composition of claim 15 to said mammal.

22. A sulfated polysaccharide as recited in claim 15, wherein said sulfated polysaccharide has substantially no activity to cause platelet aggregation.

* * * * *

UNITED STATES PATENT AND TRADEMARK OFFICE
CERTIFICATE OF CORRECTION

PATENT NO. : 5,519,010
DATED : May 21, 1996
INVENTOR(S) : FAN et al.

It is certified that error appears in the above-identified patent and that said Letters Patent is hereby corrected as shown below:

Item [73], delete ";Kotai Kasei Co., Ltd., Kodama, both of" and insert therefor --,--

Item [30], delete "Jun. 2," and insert therefor --Feb.6,--.

Signed and Sealed this

Thirtieth Day of December, 1997

Attest:

BRUCE LEHMAN

*Attesting Officer*     Commissioner of Patents and Trademarks